US011210667B2

(12) United States Patent
Song et al.

(10) Patent No.: US 11,210,667 B2
(45) Date of Patent: *Dec. 28, 2021

(54) CUSTOMER IDENTITY VERIFICATION SYSTEM

(71) Applicants: Yuh-shen Song, Porter Ranch, CA (US); Catherine Lew, Porter Ranch, CA (US); Alexander Song, Porter Ranch, CA (US); Victoria Song, Porter Ranch, CA (US)

(72) Inventors: Yuh-shen Song, Porter Ranch, CA (US); Catherine Lew, Porter Ranch, CA (US); Alexander Song, Porter Ranch, CA (US); Victoria Song, Porter Ranch, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/512,188

(22) Filed: Jul. 15, 2019

(65) Prior Publication Data

US 2019/0340610 A1 Nov. 7, 2019

Related U.S. Application Data

(63) Continuation of application No. 13/012,728, filed on Jan. 24, 2011, now Pat. No. 10,395,245.

(60) Provisional application No. 61/456,727, filed on Nov. 12, 2010.

(51) Int. Cl.
*G06Q 20/40* (2012.01)
*G06Q 40/02* (2012.01)

(52) U.S. Cl.
CPC ............. *G06Q 20/40* (2013.01); *G06Q 40/02* (2013.01)

(58) Field of Classification Search
CPC ....... G06Q 20/40; G06Q 40/02; G06Q 20/384
USPC .......................................................... 705/44
See application file for complete search history.

(56) References Cited

U.S. PATENT DOCUMENTS

| | | | | |
|---|---|---|---|---|
| 2006/0010487 A1* | 1/2006 | Fierer | ..................... | H04L 63/08 726/5 |
| 2006/0101508 A1* | 5/2006 | Taylor | ..................... | G06F 21/32 726/7 |
| 2008/0319889 A1* | 12/2008 | Hammad | ............... | G06Q 40/00 705/35 |
| 2009/0313069 A1* | 12/2009 | Love | ........................ | G06K 5/00 235/380 |
| 2010/0161816 A1* | 6/2010 | Kraft | ...................... | G06Q 10/00 709/229 |
| 2010/0325026 A1* | 12/2010 | Song | ...................... | G06Q 40/00 705/35 |

OTHER PUBLICATIONS

Trust Negotiation in Identity Management. Bhargav-Spantzel, Squicciarini, and Bertino. IEEE Computer Society, p. 55-63. 2007 (Year: 2007).*

(Continued)

*Primary Examiner* — Alexander G Kalinowski
*Assistant Examiner* — John O Preston
(74) *Attorney, Agent, or Firm* — Seyfarth Shaw LLP

(57) ABSTRACT

A computerized system conducts customer identification processing for customers who remotely open accounts with personal identification information that cannot be verified through available data sources.

18 Claims, 5 Drawing Sheets

(56) References Cited

OTHER PUBLICATIONS

Authentication in an Internet Banking Environment. Federal Financial Institutions Examination Council. 2005 (Year: 2005).*
Intelligent Technologies for Managing Fraud and Identity Theft. Third International Conference on Information Technology: New Generations. Apr. 2006. (Year: 2006).*
Trust Negotiation in Identity Management. Elisa Bertino et al. IEEE Security & Privacy. Mar. 2007 (Year: 2007).

* cited by examiner

CUSTOMER IDENTITY VERIFICATION SYSTEM

CROSS REFERENCE TO RELATED APPLICATIONS

This application is a continuation of U.S. patent application Ser. No. 13/012,728, filed on Jan. 24, 2011, and entitled "GLOBAL CUSTOMER IDENTIFICATION NETWORK," which claims the benefit of U.S. Provisional Patent Application No. 61/456,727, filed on Nov. 12, 2010, and entitled "GLOBAL CUSTOMER IDENTIFICATION NETWORK," the disclosures of which are expressly incorporated by reference herein in their entireties.

TECHNICAL FIELD

The present disclosure relates generally to global customer identification. More specifically, the present disclosure relates to verifying the identification information of a new customer who opens an account remotely.

BACKGROUND

After the 9/11 tragedy, the U.S. government recognized that financial institutions in the USA had not known their customers well enough and, as a result, terrorists had opportunities to finance their activities through the U.S. financial institutions.

The USA PATRIOT Act was established to strengthen the U.S. homeland security. Section 326 of the USA PATRIOT Act requires financial institutions to verify the identity of a new customer and to compare the customer identity with the blacklist published by the government so that terrorists, money launderers, and fraudsters cannot use financial institutions as vehicles to commit terrorist financing, money laundering, and fraud based on fake or stolen identities.

If a U.S. financial institution fails to comply with the USA PATRIOT Act, the financial institution may be subjected to severe regulatory penalties. In fact, hundreds of millions of dollars of regulatory penalties have already been levied by the U.S. regulators and government agencies to financial institutions as a result of the USA PATRIOT Act.

The impact of the USA PATRIOT Act is not limited to financial institutions only. Any organization, service provider, or individual (e.g., money services business, social network, accountant, etc.) which can be involved with money laundering and terrorist financing activities is impacted by the USA PATRIOT Act.

In addition, the USA PATRIOT Act has also strengthened the enforcement of other laws such as the Bank Secrecy Act, the Fair and Accurate Credit Transactions Act, the Unlawful Internet Gambling Enforcement Act, the requirements of the Office of Foreign Assets Control, etc. A U.S. company can be severely penalized for breaking any of these laws.

Historically, many methods have already been developed to authenticate a person's identity based on an identification document. For example, a hologram graphic can be embedded on the identification document and the hologram graphic will appear when the identification document is placed under a special light. If an identification document does not have this hologram graphic, this identification document is a counterfeit. If the identification document is not a counterfeit and the photo on the identification document matches the appearance of the identification document holder, the information embedded within or on the identification document can be used to verify the identity of the identification document holder.

Similarly, personal identification data such as a fingerprint can be embedded within or on the identification document and a card reader can read the embedded data to authenticate the identity of the identification document holder. For example, if the fingerprint of the identification document holder matches the fingerprint information embedded within or on the identification document, the identification information and personal information displayed on the identification document or extracted from the embedded data can be treated as the identification information and personal information of the identification document holder.

Traditionally, when a new customer opens an account with a financial institution, a representative of the financial institution will examine the identification document of the new customer to make sure that (1) the identification document is official and valid, (2) the new customer is the real owner of the identification document, and (3) the identification information and personal information such as name, date of birth, address, identification document number, etc. provided by the new customer corresponds to the information shown on the identification document.

This traditional approach to identify a customer is no longer useful in the modern age when a new customer opens an account remotely through a network, e.g., the Internet, telephone network, etc. Because a representative of the financial institution cannot remotely examine the identification document and the identification document holder as the representative used to do in person, a fraudster can easily open an account based on fake or stolen identification information.

Although a financial institution can ask a new customer to send a copy of his/her identification document to the financial institution for verification purposes, government regulators and many other organizations do not accept this method of customer identification because the financial institution has no way to distinguish whether the copy is made based on an official identification document or a counterfeit identification document.

At the time of this disclosure, the most commonly used method of verifying the personal identification information provided by a new customer who opens an account remotely is to utilize the information provided by credit report companies such as Equifax, TransUnion, Experian, etc. The representative of the financial institution can ask the new customer some detailed personal questions based on the information provided by the credit report companies then determine whether the new customer has the correct identity, as the new customer claims.

For example, the representative of the financial institution can ask the new customer which company financed the loan when the new customer bought his/her car. If a fraudster tries to open an account based on a victim's stolen personal identification information, it is unlikely that the fraudster also knows all the credit history of the victim. Therefore, a financial institution can achieve an acceptable level of accurate customer identification through this method.

If a fraudster tries to open an account based on a fake identity, a financial institution can refuse to open an account because no credit history can be found from any credit report company based on the fake identity.

Although the above method is commonly used today, there are several drawbacks with this method. First, it is a very expensive account opening process to get a credit report of each new customer. A financial institution needs to spend a great deal of money if this method is used. In general, only large financial institutions can afford such investment. This cost factor has practically restricted small financial institutions from competing against large ones.

Moreover, many people such as students or recent graduates do not have any credit history. As a result, students or recent graduates cannot open accounts remotely if this method is used.

In addition, credit reports are only available in the U.S. and some other well-developed countries. Because credit reports cannot be obtained for civilians and citizens in most countries worldwide, given the severe regulatory penalties issued by the U.S. regulators and government agencies as a result of the USA PATRIOT Act, the U.S. financial institutions and other organizations do not want to open new accounts for foreigners who submit the applications remotely. Therefore, the USA PATRIOT Act has actually restricted the U.S. companies from competing against foreign companies globally.

In fact, even with the help of credit report, a financial institution may not be able to detect a fraudster who remotely opens an account based on stolen identity of a victim if the fraudster knows the victim very well. For example, a man may easily use his ex-girl friend's or ex-wife's identity to open an account remotely because he knows the credit history of his ex-girlfriend or ex-wife. There are many loopholes associated with the existing customer identification methods which are used to identify customers who open account remotely.

Obviously, there is an urgent need for a new customer identification solution to open accounts globally for new customers who submit applications at any place in the world. The present disclosure intends to provide such solution.

SUMMARY OF THE DISCLOSURE

The present disclosure enables financial institutions and other organizations to effectively conduct customer identification on new customers who submit applications remotely even if the new customers do not have any credit history or if the new customers are civilians or citizens of some countries where credit reports are not available. In addition, the present disclosure enables financial institutions and other organizations prevent identity theft and fraud.

Although we use opening accounts with financial institutions as an example in this document, the present disclosure can be applied to many other situations where customer identification is required.

Official identification documents have been adopted by governments worldwide to identify persons. Although different types of identification documents are used, many methods have been developed to distinguish the real documents from the counterfeits. In fact, people working for financial institutions or merchants are often trained to identify counterfeit identification documents based on different tools and methods.

Furthermore, it is customary for a merchant or financial institution to request a consumer to present an identification document during a financial transaction. Consumers are accustomed to this type of request and will submit their identification documents to merchants or financial institutions in order to complete the transactions. For example, when a person purchases goods or services with a credit card at a store, the cashier of the store may request the person to present his/her identification document to ensure that this person truly owns the credit card.

Moreover, merchants and financial institutions have the incentive to detect counterfeit identification documents so that they can prevent losses and damages caused by fraudsters.

The present disclosure uses a network to verify the accuracy of the identification document and, at the same time, collect the personal identification information shown on or extracted from the identification document of a person when the person conducts transactions with third parties. This collected information is used by a financial institution or other organization to verify the personal identification information submitted by the person when the person opened an account with the financial institution or other organization. As a result, custom identification of a person can be effectively achieved through a network of third-party entities conducting transactions with the person during their normal courses of business with the person.

In this disclosure, the terminology "network" generally refers to a communication network or networks, which can be wireless or wired, private or public, real time or non-real time, or a combination of them, and includes the well-known Internet.

In this disclosure, the terminology "computer" or "computer system" generally refers to either one computer or a group of computers, which may work alone or work together to accomplish the purposes of the system.

In this disclosure, the terminology "processor" generally refers to either one processor or a group of processors, which may work alone or work together to accomplish the purposes of the processor.

In this document the term "module" refers to a single component or multiple components which can be hardware, software, firmware, or a combination thereof, and may work alone or work together to accomplish the purposes of the module.

In this disclosure, a "bank" or "financial institution" generally refers to a financial service provider, either a bank or a non-bank, where financial services are provided.

In this disclosure, a "bank account" or "financial account" generally refers to an account associated with a financial institution, either a bank or a non-bank, where financial transactions can be conducted through financial instruments such as cash, checks, credit cards, debit cards, ATM cards, stored value cards, gift cards, pre-paid cards, wires, monetary instruments, letters of credit, notes, securities, commercial papers, commodities, precious metal, electronic fund transfers, automatic clearing house, etc.

In this disclosure, "financial transactions" generally refer to transactions related to financial activities, including but not limited to payment, fund transfer, money services, payroll, invoicing, trading, escrow, insurance, underwriting, merger, acquisition, account opening, account closing, etc.

In this disclosure, "trading" generally refers to trading activities, both private and public, including but not limited to trading of stock, currency, commodities, rights, values, securities, derivatives, goods, services, merchandise, etc.

In this disclosure, "securities" are generally referred to according to the definition in the Securities Act of 1933. For example, securities may generally include note, stock certificate, bond, debenture, check, draft, warrant, traveler's check, letter of credit, warehouse receipt, negotiable bill of lading, evidence of indebtedness, certificate of interest or participation in any profit-sharing agreement, collateral-trust certificate, preorganization certificate or subscription, transferable share, investment contract, voting-trust certificate; valid or blank motor vehicle title; certificate of interest in property, tangible or intangible; instrument or document or writing evidencing ownership of goods, wares, and merchandise, or transferring or assigning any right, title, or interest in or to goods, wares, and merchandise; or, in general, any instrument commonly known as a "security", or any certificate of interest or participation in, temporary or interim certificate for, receipt for, warrant, or right to subscribe to or purchase any of the foregoing.

In this disclosure, a "consumer" generally refers to a customer, person, subject, payer, payee, beneficiary, user, or client, etc., seeking to perform a transaction with an individual, an organization, a merchant, and/or a financial institution.

In this document, the terminology "identification document" generally refers to a passport, driver's license, voter card, benefits card, student identification card, social security card, national identification card, identity card, certificate of legal status, and other official documents and information bearing instruments that identify a designated individual by certain verifiable characteristics, that are issued or certified by a consulate, embassy, government agency, public or private organizations or other governmental authorities, and that are protected against unauthorized copying or alteration by the responsible party or parties. In particular, such "identification documents" can be formed from various materials, including paper, plastic, polycarbonate, PVC, ABS, PET, Teslin, composites, etc. and can embed the identification information in various formats, including printed or embossed on the document (or card), written on a magnetic medium, programmed into an electronic device, stored in a memory, and combinations thereof. The "identification information" may include, but is not necessarily limited to, names, identification numbers, date of birth, signatures, addresses, passwords, phone numbers, email addresses, personal identification numbers, tax identification numbers, national identification numbers, countries that issue the IDs, states that issue the IDs, ID expiration date, photographs, fingerprints, iris scans, physical descriptions, and other biometric information. The embedded information can be read through optical, acoustic, electronic, magnetic, electromagnetic, and other media.

In this disclosure, "personal identification information" generally refers to name, address, date of birth, personal identification number, user ID, password, tax identification number, type of the identification document used, identity number associated with the identification document, country, state, government organization and/or a private organization issuing the identification document, expiration date of the identification document, phone number, screen name, e-mail address, photographs, fingerprints, iris scans, physical descriptions, and other biometrical information.

In this disclosure, "personal information" includes at least one of personal identification information, personal relationships, personal status, personal background, personal interests, and personal financial information including information related to financial instruments, financial accounts, and financial activities.

In this disclosure, "financial instruments" generally refer to instruments which are used to conduct financial transactions. Examples of financial instruments include cash, credit cards, debit cards, ATM cards, prepaid cards, stored value cards, gift cards, checks, monetary instruments, wire transfers, letters of credit, notes, securities, commercial papers, commodities, gold, silver, etc.

In this disclosure, a "personal communication device" generally refers to a device interface used for personal communication purposes.

In this disclosure, a "device interface" generally refers to a keyboard, a keypad, a monitor, a display, a terminal, a computer, a control panel, a vehicle dash board, a network interface, a machinery interface, a video interface, an audio interface, an electrical interface, an electronic interface, a magnetic interface, an electromagnetic interface including electromagnetic wave interface, an optical interface, a light interface, an acoustic interface, a video interface, an audio interface, a contactless interface, a mobile phone interface, a smartphone interface, a smartbook interface, other communication device interface, a Personal Digital Assistant (PDA) interface, a handheld device interface, a portable device interface, a wireless interface, a wired interface, and other interfaces.

In this document, the terminology "terminal" or "kiosk" generally refers to equipment, including a computer and/or its peripherals, microprocessor and/or its peripherals, ATM terminal, check-cashing kiosk, money services kiosk, merchant checkout stand, cash register, coin exchange machine, parking lot payment kiosk, other payment kiosks, contactless device, wire line phone, mobile phone, smartphone, smartbook, personal communication device, tablet device, digital assistant, entertainment device, network interface device, router, and/or Personal Digital Assistant (PDA), etc., which interfaces a user with a computer network, so that the user may interact with computer systems and other equipment connected to the computer network.

For a further understanding of the nature and advantages of the present disclosure, reference should be made to the following description taken in conjunction with the accompanying drawings.

DETAILED DESCRIPTION

Figure 1:
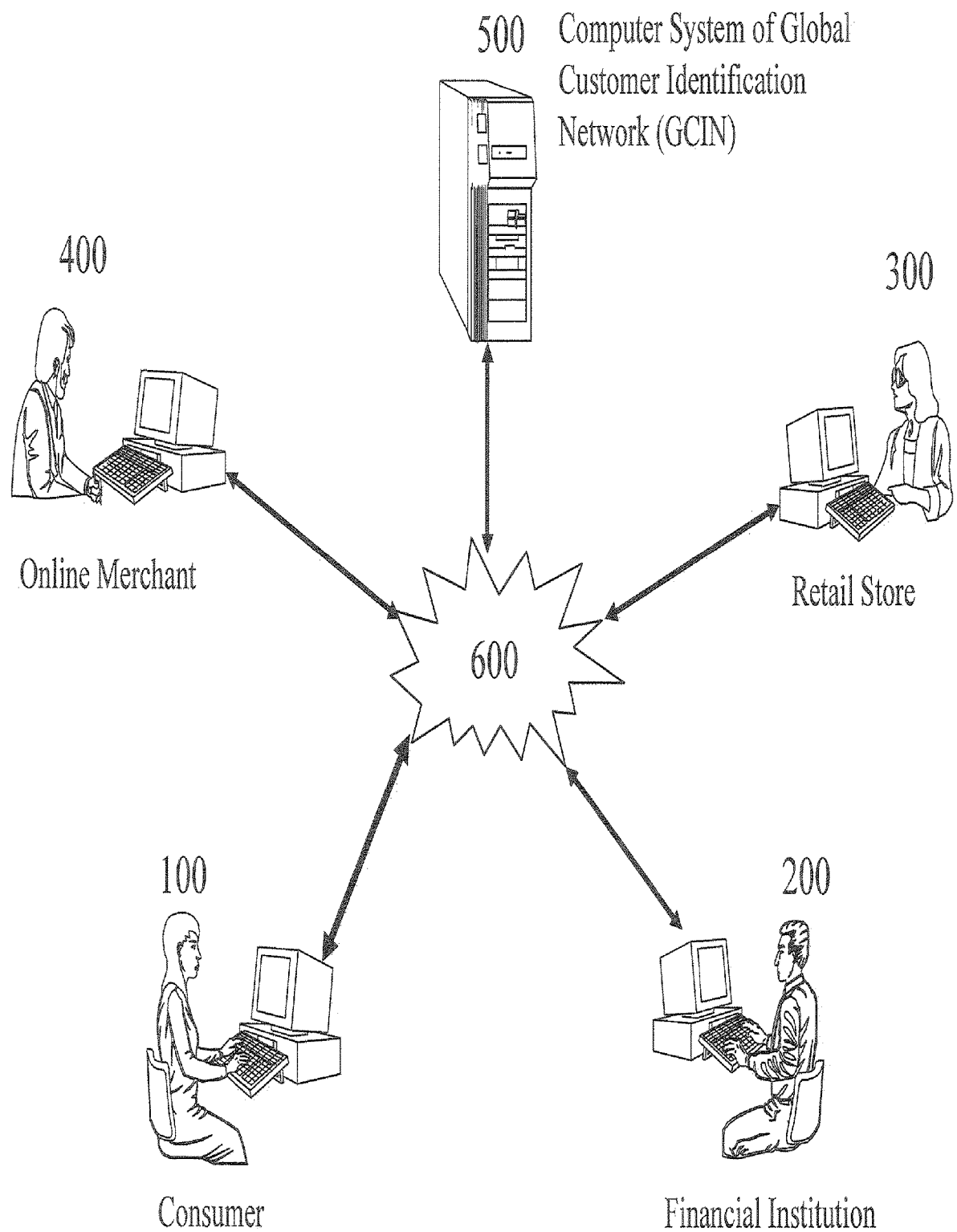
FIG. 1 illustrates a system and network diagram of a Global Customer Identification Network ("GCIN") to enable consumers, financial institutions and merchants to jointly conduct customer identification.

The U.S. government strictly enforces financial institution (e.g., banks, credit unions, stockbrokers, insurance companies, etc.) compliance with the USA PATRIOT Act, the Bank Secrecy Act (BSA), the Fair and Accurate Credit Transactions Act (FACT Act), the Unlawful Internet Gambling Enforcement Act (UIGEA), the regulations set by the Office of Foreign Assets Control (OFAC) and other related laws and regulations. Hundreds of millions of dollars in Civil Monetary Penalties (CMPs) have already been levied by the U.S. government regulators and agencies to some financial institutions for violating these laws and regulations. Verifying customer identity (i.e., customer identification) is essential to complying with these laws and regulations.

The Internet has changed our world tremendously. An organization has the opportunity to open accounts for members and/or clients all over the world through the Internet. However, without effective customer identification, this organization may become the vehicle for money laundering, terrorist financing, fraud, and other criminal activities.

For example, many fraudsters have already used social networks, which do not conduct customer identification, to commit fraud. Money launders and terrorists have already used the services provided by some Internet-based companies to conduct money laundering and terrorist financing activities.

In fact, the U.S. government has classified those Internet companies permitting members and/or clients to conduct money transfer, payment transaction among members and/or clients, and any other equivalent value purchase or exchange as Money Services Businesses (MSBs). These MSBs have to comply with the USA PATRIOT Act, the Bank Secrecy Act, the FACT Act, the OFAC regulations, and other related laws and regulations to prevent money laundering and terrorist financing activities. Both E-Gold and Paypal, which are not traditional financial institutions, have already received severe regulatory penalties issued by the U.S. government. Many U.S. organizations and individuals will face regulatory pressure similar to what U.S. financial institutions are facing today.

To prevent money laundering, terrorist financing, fraud, and financial crimes, many other countries have established laws, rules, and regulations that are similar to what the U.S. government has established. As a result, the great potential promised by the Internet has been blocked by laws and regulations because there has been no effective way to verify the identity of a customer who opens an account remotely.

A goal of the present disclosure is to provide an effective customer identification solution so that a remote person can open an account, through a network, at any location in the world.

When a consumer opens an account with an organization online, this organization can require the consumer to provide some personal identification information and contact information. In one embodiment of the present disclosure, the organization verifies the consumer's identity with the blacklists, e.g., the OFAC list, etc., published by various government organizations worldwide to ensure it is not against laws and regulations to conduct business with this consumer.

In addition, in one embodiment of the present disclosure, the organization starts to monitor the activities of the consumer to ensure that there is no suspicious activity. If there is a suspicious activity involved with the consumer, the organization may report the suspicious activity to proper government organizations and agencies, e.g., the Financial Crimes Enforcement Network (FinCEN) in the USA.

If the organization is a financial institution in the USA, in one embodiment of the present disclosure, the financial institution may report the suspicious activity through a Suspicious Activity Report (SAR) to FinCEN in accordance with the Bank Secrecy Act. Furthermore, in one embodiment of the present disclosure, the U.S. financial institution may verify the identity of the consumer with the 314(a) list that is periodically published by FinCEN according to Section 314(a) of the USA PATRIOT Act. If the identity of the consumer matches an entity on the 314(a) list, the financial institution reports such match to FinCEN in compliance with the USA PATRIOT Act.

In another embodiment of the present disclosure, the financial institution may report to the proper government organizations or agencies cash transactions with an aggregate amount over a limit set by the government. In yet another embodiment of the present disclosure, the financial institution may report to the proper government organizations or agencies cross-border transactions with an aggregate amount over a limit set by the government.

To avoid being caught, a fraudster, money launderer, or terrorist may not provide his true identity during the account opening process. The organization therefore conducts customer identification to verify the true identity of the new customer.

However, as explained earlier, there is no easy way for the organization to determine whether the information provided by the consumer is correct if the account is opened remotely. Verifying the identity of a new customer who remotely opens an account becomes even more difficult when the new customer has no credit history or when the new customer is a resident of a country where no public records are available to verify the identity of a person.

The present disclosure uses a computer network, e.g., the Internet, to reach many third-party entities, including merchants, financial institutions, schools, government organizations, companies, individuals, for-profit organizations, nonprofit organizations, etc. In one embodiment of the present disclosure, when a consumer conducts a transaction with a third party, a central computer uses the transactional information (e.g., an account number or account ID used in the transaction) to search for the consumer's personal identification information which was collected from the consumer during the account opening process.

The "transaction" described above includes both financial transactions, e.g., a payment, and non-financial transactions, e.g., an inquiry. In general, any activity related to an account, a subject, a consumer, or a record can be called a transaction.

In one embodiment of the present disclosure, verification of an identity results from the central computer randomly selecting a piece of data which appears on and/or is embedded within the consumer's identification document. A third party conducting the transaction (referred to as a merchant for ease of explanation) is prompted to input the randomly selected piece of Identification data. Thus, the merchant requests the consumer to provide an identification document which contains such piece of data. For example, the central computer system can prompt the merchant to enter the last four digits of the identification document number, the date of birth, the last name, first name initial, zip code of the address, country or state that issued the identification document, expiration date, etc. The data input can be accomplished by either the merchant manually inputting the data or a device interface which can read the embedded data from an identification document.

Other merchants will enter different pieces of randomly selected data when the consumer conducts transactions with these other merchants. Thus, as more transactions occur, different pieces of data will be received from the various merchants, providing verification of different aspects of the identification data.

This process slices the entire set of identification data, which needs to be verified, into many small pieces of data like a jigsaw puzzle. Although each merchant only enters one small piece of the data for each transaction with the consumer, the entire set of identification data will be fully verified when additional transactions occur (possibly with different merchants). In this case, more data is verified when additional pieces have been correctly entered by the merchants involved in the process.

In one embodiment of the present disclosure, the central computer system repeatedly asks different merchants the same question. If multiple merchants provide the same answer, it will enhance the reliability of such answer.

In another embodiment of the present disclosure, the central computer system asks different questions which may produce overlapped answers. If the overlapped portion is identical, the reliability of the overlapped answers is further enhanced. The central computer can achieve higher accuracy and reliability in the identity verification process by prompting different merchants to answer different questions in different transactions at different locations. For example, the central computer can prompt a first merchant to enter the last name of the consumer; a second merchant to enter the middle name of the consumer; a third merchant to enter the first name of the consumer; a fourth merchant to enter the year of birth; a fifth merchant to enter the last four digits of the identification document number; etc.

In one embodiment of the present disclosure, if the consumer only conducts transactions with the same merchant, this identity verification process is withheld so that one merchant cannot provide more than a pre-defined number of pieces of identification information prompted by the central computer.

Because many different merchants are involved in this identity verification process at different times and locations, it is difficult for a fraudster to bribe or otherwise conspire with all these merchants to cover up the fraudster's false identity. It may not be desirable to have only single merchant answering all questions during a transaction because one merchant can be easily bribed. Furthermore, it would unfairly burden a merchant by requesting all personal identification information of a consumer to be manually entered by the merchant during a transaction.

In addition, a consumer may not feel comfortable when an entity (e.g., merchant) enters all of his/her personal identification information into a device interface during a transaction because such personal information may be viewed by the consumer as private and confidential. Because some supermarkets and gas stations have been asking consumers to provide partial personal information, e.g., zip code, during payment transactions, consumers are accustomed to such questions and will not mind providing some partial data such as the year of birth for identity verification purposes.

In one embodiment of the present disclosure, a merchant uses a device interface to read the personal identification data embedded within or on the identification document and the device interface directly sends the data to the central computer. Because the data is read electronically from the identification document and sent directly to the central computer, the fraud committed by fraudsters and third parties, e.g., merchants, as explained above, can be reduced or eliminated.

As discussed above, the questions can be randomly presented during different transactions so that fraudsters cannot prepare for the answers in advance. In another embodiment of the present disclosure, the central computer randomly decides whether to even ask a question during a particular transaction. Thus, because of the random nature of the process, a fraudster cannot predict what will happen in the transaction.

If a consumer did not provide accurate personal identification information during the account opening process, the data entered by the merchant will not correspond to the records collected from the consumer during the account opening process. Therefore, when the identification data entered by a merchant does not correspond to the identification data in the account records, either the consumer has provided an inaccurate identification document for the transaction or the consumer had provided inaccurate information during the account opening process.

Because either case implies a fraudulent intention, in one embodiment of the present disclosure, the central computer rejects the transaction or informs the merchant to reject the transaction when the identification data entered by the merchant does not correspond to the identification data in the account records to protect the merchant and/or the organization which services the consumer's account.

In one embodiment, after the identification information in the account records of a consumer has been verified as "accurate" with a certain degree of confidence, through receiving a sufficient number of pieces of correct identification information during various transactions, the identity verification of the consumer may be suspended in future transactions.

In another embodiment of the present disclosure, after all the identification information in the account records of a consumer has been completely verified, the identity verification of the consumer may be suspended in future transactions. For easy explanation, the period from the beginning of the identity verification to the time when all the identification information in the account records of a consumer has been completely verified is referred to as "identity verification phase."

Because all the identification information in the account records of the consumer has been fully verified after the identity verification phase, the identification information in the account records can be used for fraud prevention purposes.

In one embodiment of the present disclosure, the central computer system continues to ask identity verifying questions even after the identity verification phase. This continuous process can prevent fraud caused by stolen financial instruments. For example, if a fraudster steals the consumer's credit card information and uses a counterfeit card to conduct transaction, the chance for the fraudster to know all the personal identification information of the consumer is very low. Even if the fraudster uses a counterfeit identification document to conduct a transaction and the merchant fails to recognize that the identification document is counterfeit, the information on this counterfeit identification document will not correspond to the personal identification information in the account records of the consumer. Therefore, if a merchant enters incorrect information in this continuous process, it is possible that a fraudster is conducting a transaction with the merchant based on a counterfeit identification document. The central computer may reject the transaction or inform the merchant to stop the transaction to prevent fraud.

As a result, this approach also prevents fraud committed by a fraudster because a correct identification document must be used to complete the transaction. Because fraud would adversely affect the merchant, the merchant conducting a transaction with a consumer has the incentive to participate in this identity verification process to prevent losses and damages caused by fraud.

Similarly, this approach also prevents identity theft. If a fraudster successfully opened an account based on a stolen identity of a victim, the fraudster will not be able to provide an identification document of the victim to conduct the transaction.

If a fraudster purposely provides incorrect information during the account opening process and uses a counterfeit identification document based on the incorrect information to conduct transactions with merchants, the likelihood of any merchant detecting the counterfeit identification document is high because merchants are trained to recognize counterfeit identification documents. If a merchant detects a counterfeit identification document, in one embodiment of the present disclosure, the merchant reports the detected case of counterfeiting to the central computer.

During the identity verification phase, the central computer may freeze the consumer's account and conduct further investigation when the identification data entered by any of the merchants does not correspond to the identification data provided by the consumer during the account opening process or when a merchant has reported a counterfeit identification document used by the consumer.

For example, to conduct further investigation, in one embodiment of the present disclosure, the central computer can request the consumer to meet a representative of the central computer system so that the consumer's identity can be thoroughly verified in person.

Alternatively, in another embodiment of the present disclosure, the central computer can immediately close the account when the identification data entered by any of the merchants does not correspond to the identification data provided by the consumer during the account opening process or when a merchant has reported a counterfeit identification document used by the consumer.

In one embodiment of the present disclosure, the organization, e.g., financial institution, involved in the transaction files a Suspicious Activity Report ("SAR") to report identity theft in compliance with the Bank Secrecy Act and the FACT Act.

To further eliminate money laundering, terrorist financing, fraud and other criminal activities, in one embodiment of the present disclosure, a consumer account can be restricted for certain activities until the account is fully verified by the central computer. For example, a financial account holder can be restricted to conducting only limited transactions during a period of time, e.g., less than $200 per week, until the central computer has fully verified the identity of the account holder. Because money launderers, terrorists, fraudsters and other criminals likely do not want to risk jail time for a total transactional amount of less than $200 week, the above limit effectively eliminates or reduces the risk of money laundering, terrorist financing, fraud, and other financial crimes.

In yet another embodiment of the present disclosure, the central computer also monitors the frequency of canceled transactions of a consumer. Because a fraudster knows that he is using a counterfeit identification document, he may cancel the transaction if the third party (e.g., merchant) questions him about his counterfeit identification document. Therefore, frequent cancellations can also be used as an alert associated with the consumer. A financial institution may conduct further investigation on the account holder if frequent cancellations of transactions have occurred in the account.

In general, due to privacy concerns, it may not be desirable for the central computer to provide the personal identification information of the account holder and merely ask a merchant to confirm the identification information. For example, a fraudster can work together with a merchant to steal the personal identification information if the personal identification information is provided by the central computer. In fact, the Gramm-Leach-Bliley Act (GLB Act) prohibits U.S. financial institutions from disclosing their clients' non-pubic personal information. Therefore, it is not desirable to display the personal identification information of the account holder during a transaction.

Furthermore, a third party may not seriously conduct the identity verification process if the third party only selects "YES" or "NO" as an answer. For example, when a clerk of a merchant is tired, he may tend to select "YES" to get his job done quickly without truly examining the identification document in details. Therefore, as described above, the merchant supplies a piece of personal identification information of the consumer to the central computer and the central computer does not provide the personal identification information to the merchant. This approach reduces or eliminates the chance for identity theft by third parties and is compliant with the GLB Act.

However, the GLB Act or privacy may not be a concern in certain countries or industries. In one embodiment of the present disclosure, the central computer provides the identification information in the account records of a consumer during a transaction and requests the merchant to confirm whether the identification information provided by the central computer is correct.

In one embodiment of the present disclosure, the central computer selects only certain credible merchants to conduct this identity verification process to avoid the potential abuse by merchants considered to be susceptible to bribery from fraudsters. For example, the central computer only requests identification information verification from some publicly-listed companies believed to have higher ethical standards.

In one embodiment of the present disclosure, the central computer also records which merchants are involved in the identity verification process of each account holder. If the central computer has determined that a particular account holder has provided incorrect information during the account opening process, all merchants, which have mistakenly verified the account holder's false identity as real before, should be classified as "third parties with questionable credibility."

In one embodiment of the present disclosure, the central computer may re-conduct all the identity verifications conducted by these "third parties with questionable credibility."

In another embodiment of the present disclosure, the central computer may randomly re-conduct some of the identity verifications conducted by these "third parties with questionable credibility" and compare the new verification results with the old verification results. If the comparison indicates that a "third party with questionable credibility" has purposely made mistakes, more corrective actions can be taken to fix the problems.

For example, in one embodiment of the present disclosure, more identity verifications, which were conducted by this "third party with questionable credibility," will be re-conducted.

In another embodiment of the present disclosure, a penalty can be issued to this "third party with questionable credibility" based on a commercial arrangement with the third party.

In yet another embodiment of the present disclosure, a regulatory report about this third party may be filed to the proper government organizations and agencies.

Because the merchant can see the consumer in person, the merchant can verify (1) whether the photo on the identification document matches the appearance of the consumer, and (2) whether the identification document is real and valid.

To further help the merchants involved in the above identity verification process prevent fraud, in one embodiment of the present disclosure, an account holder uploads his/her photo during the account opening process. As a result, the central computer can send the photo, collected from the account holder during the account opening process, to the merchant conducting a transaction with a consumer based on the account. If the photo of the account holder shown on the device interface does not match the appearance of the consumer, the consumer may be a fraudster who intends to steal the account.

Sometimes, a consumer may change his/her identification document. For example, if a U.S. resident moves from one state to another state, he/she may receive a new driver's license issued by the new state. If a consumer changes his/her identification document, in one embodiment of the present disclosure, the consumer updates his/her account records and the central computer will re-conduct the identity verification of the consumer based on the new identification document.

In one embodiment, if the identity of the consumer was previously verified based on an old identification document, only a partial set of personal identification information may be re-verified when the consumer changes his/her identification document. That is, the identity verification may be less rigorous if the consumer was previously verified.

In one embodiment, the present disclosure is integrated into the existing networks of payment systems, e.g., credit card, debit card, pre-paid card, gift cards, Automated Clearing House (ACH), Automated Teller Machine (ATM), Society for Worldwide Interbank Financial Telecommunication (SWIFT), Wire, etc. so that financial institutions can fulfill their customer identification obligations required by laws and regulations.

In another embodiment, the present disclosure is integrated with online organizations' systems and networks which provide online products and services such as a social network, mobile payment, online payment, coupon purchase, credit exchange, value trade, online gaming, etc. so that these online organizations can protect their members and clients against crimes and fraud. These organizations can also comply with applicable laws and regulations regarding customer identification.

Although "merchants" are used in the above examples for easy explanation, the present disclosure also applies to other third-party entities which may not be merchants. In general, any third party conducting a transaction with a consumer can participate in this customer identification process to verify the identification information in the consumer's account records.

As contemplated in the described embodiments, one of many possible combinations is described below as an example. The computer system of the Global Customer Identification Network ("GCIN") 500 and a computer network 600, such as the Internet, enable a financial institution 200, a retail store 300 and an online merchant 400 to jointly conduct customer identification on a consumer 100, as shown in FIG. 1.

Figure 2:
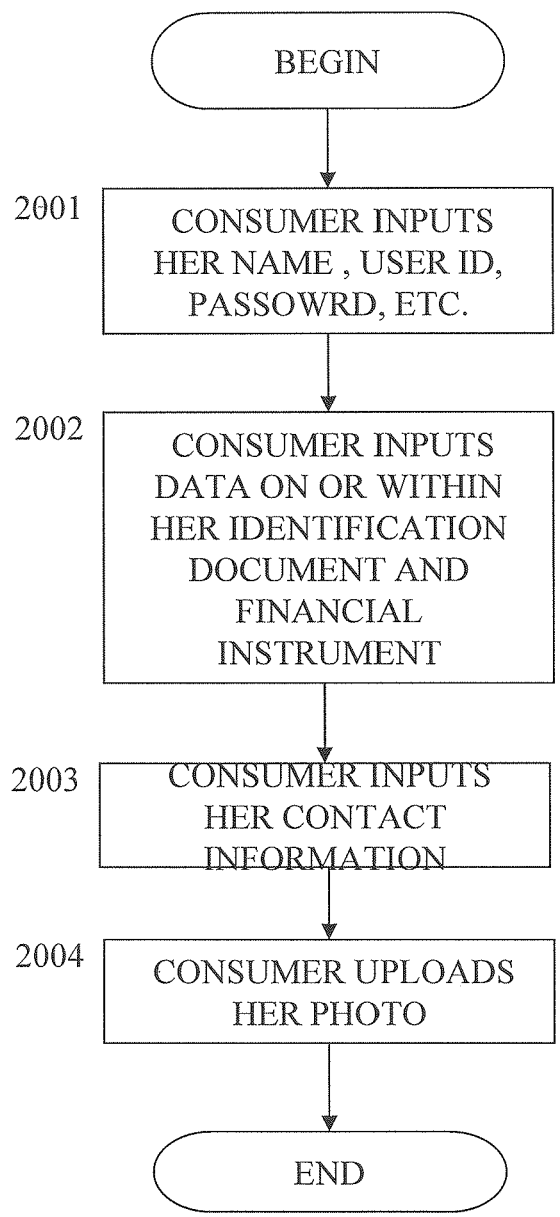
FIG. 2 is a flowchart of an example process, indicating how a consumer registers with the computer system of GCIN as shown in FIG. 1.

Reference should now be made to the flowchart of FIG. 2 in combination with the system diagram of FIG. 1, which together illustrate how a consumer can open an account with the GCIN computer system 500. In one embodiment, the consumer remotely opens the account.

First (block 2001), a consumer 100 remotely inputs her name, user ID, password and other information requested during the account opening process through a network 600. In addition (block 2002), the consumer 100 inputs her personal identification information which is embedded within or on her identification document (e.g., a driver's license) and her financial instrument (e.g., a credit card), if applicable. Alternatively, if the GCIN computer system 500 is owned by or associated with a financial institution, the financial institution may provide the GCIN computer system 500 with the information regarding the consumer's financial instrument after the account is opened for the consumer 100.

Because the personal identification information is remotely input, the information is not yet verified. For example, when a consumer opens an online account, the online organization, e.g., a social network, sometimes cannot verify whether the consumer entered accurate information. That is, the identification information may be fraudulent, but the online organization cannot verify this based on available information. This consumer input identification information will be referred to as "unverified identification information."

Furthermore (block 2003), the consumer 100 inputs her contact information that enables the GCIN computer system 500 to contact the consumer 100.

In one embodiment, to further facilitate fraud prevention, the consumer 100 uploads her photo (block 2004) for easy identification purposes. The above information provided by the consumer 100 is stored in a database of the GCIN computer system 500.

After opening an account, the consumer 100 is permitted to conduct financial transactions. During these financial transactions, the identification information of the consumer is verified piece by piece.

In one embodiment, the initial transactions are limited to small dollar amounts until sufficient identity verification has been accomplished.

Figure 3A:
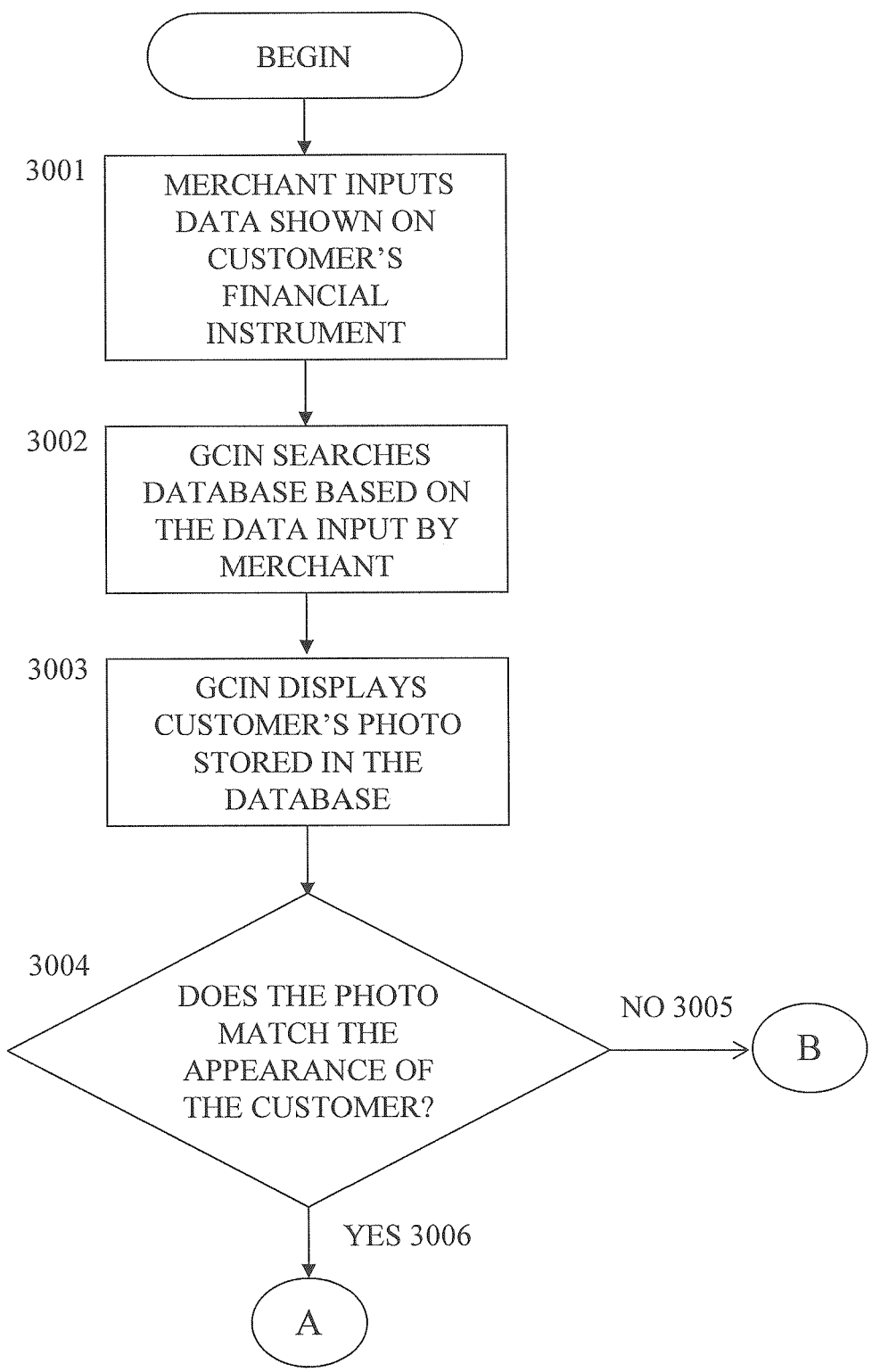
FIG. 3A and FIG. 3B are flowcharts of an example process, indicating how the system shown in FIG. 1 enables a consumer to conduct financial transaction with a retail store or financial institution in person.
Figure 3B:
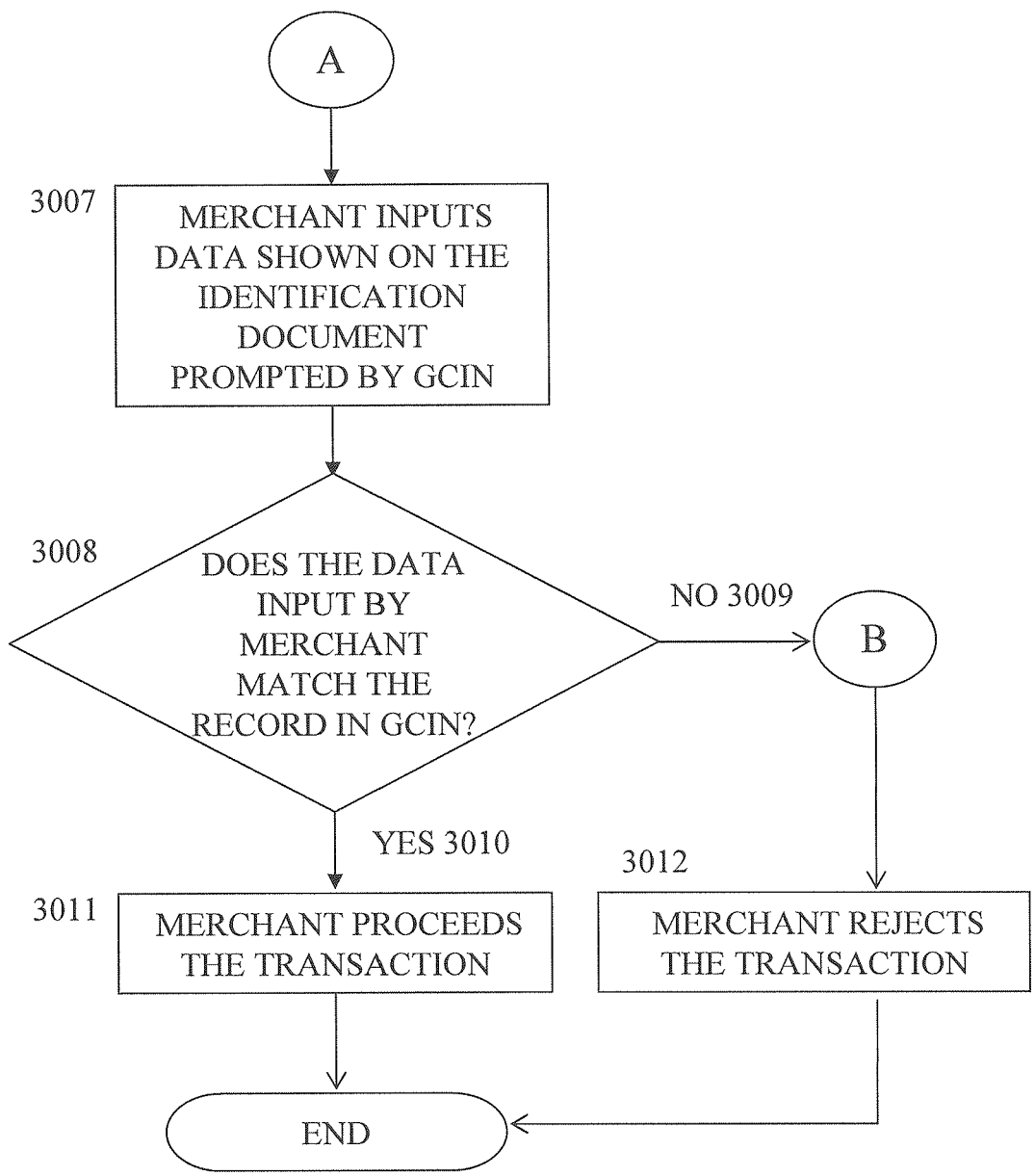

The flowchart in FIGS. 3A and 3B in combination with the system diagram of FIG. 1 illustrate how transactions will verify the identity of the consumer.

The consumer 100 provides the retail store 300 with her financial instrument (e.g., a credit card). In addition, the consumer 100 provides the retail store 300 with her identification document (e.g., a driver's license). The retail store 300 enters the identification data of the financial instrument (e.g., account number) into a device interface of the GCIN computer system 500 (block 3001).

The identification data of the financial instrument is sent to the GCIN computer system 500 via the network 600. The GCIN computer system 500 uses the received data to identify the account of the consumer 100 (block 3002).

In one embodiment, the GCIN computer system 500 sends the photo of the account holder through the network 600 to the retail store 300 and displays the photo on the device interface (block 3003).

The retail store 300 determines whether the photo matches the appearance of the customer who stands inside the retail store 300 (decision block 3004). If the photo does not match the appearance of the customer (NO branch 3005), the retail store 300 rejects the transaction (block 3012) and informs the GCIN computer system 500 of such rejection.

If the photo matches the appearance of the customer (YES branch 3006), the GCIN computer system 500 prompts the retail store 300 to enter a piece of data (e.g., the date of birth) which is displayed on the customer's identification document (e.g., the driver's license). By verifying different pieces of information from different merchants during different transactions, the verification becomes more reliable.

The retail store 300 reads the data from the consumer's identification document and inputs the data into the device interface of GCIN computer system 500 (block 3007).

The GCIN computer system 500 determines whether the received data corresponds to the record provided by the consumer 100 during her account opening process (decision block 3008).

If the received data does not correspond to the record provided by the consumer 100 (NO branch 3009), the GCIN computer system 500 informs the retail store 300 to reject the transaction (block 3012). As described above, an investigation may occur if the process is still in the identity verification phase.

If the received data corresponds to the record provided by the consumer 100 (YES branch 3010), the GCIN computer system 500 informs the retail store 300 to complete the transaction (block 3011).

Sometimes, the retail store 300 may permit the consumer 100 to interact directly with the device interface in the retail store 300. For example, an automatic checkout stand may expect the consumer 100 to interface directly with the checkout stand. Under such circumstances, a device interface can read the data embedded within or on the identification document of the consumer 100 and send the data directly to the GCIN computer system 500 (at block 3007).

Based on whether the retail store 300 enters the correct piece of identification information of the consumer 100, the GCIN computer system 500 can complete a portion of the identity verification process of the consumer 100. The flowchart in FIG. 4 and the system diagram of FIG. 1 illustrate how the identity verification process may be accomplished by the GCIN computer system 500.

The GCIN computer system 500 randomly selects a piece of data which is embedded within or on the identification document of the consumer 100 and prompts the retail store 300 to input such data based on what the retail store 300 can obtain from the identification document of the consumer 100 (block 4001).

In one embodiment, multiple merchants at multiple locations conduct transactions at different times in this identity verification process. Because the merchants are randomly selected and the piece of data which each merchant is requested to input is randomly selected (and likely different), it is very difficult for the consumer 100 to cheat or bribe all the merchants. In addition, commercial arrangements can be made between the GCIN computer system 500 and the merchants to ensure that merchants will perform honestly and diligently in this identity verification process.

The GCIN computer system 500 determines whether the data input by the retail store 300 corresponds to the record provided by the consumer 100 during the account opening process (decision block 4002).

If the piece of data input by the retail store 300 corresponds to the record (YES branch 4003), no action will be taken. If the piece of data input by the retail store 300 does not correspond to the record (NO branch 4004), the GCIN computer system 500 will immediately freeze the account of consumer 100 and request the consumer 100 to contact the GCIN computer system 500 (block 4005).

Under such circumstances, the GCIN computer system 500 may need to take additional actions to conduct customer identification. For example, the consumer 100 may be requested to bring her identification document to meet a representative of the GCIN computer system 500 in person so that the representative of the GCIN computer system 500 can thoroughly verify the identity of the consumer 100. If this event occurs after the identity verification phase (i.e. all the identification information in the account records has been completely verified, meeting the consumer may not be necessary because this may be a fraud committed by a fraudster.)

Figure 4:
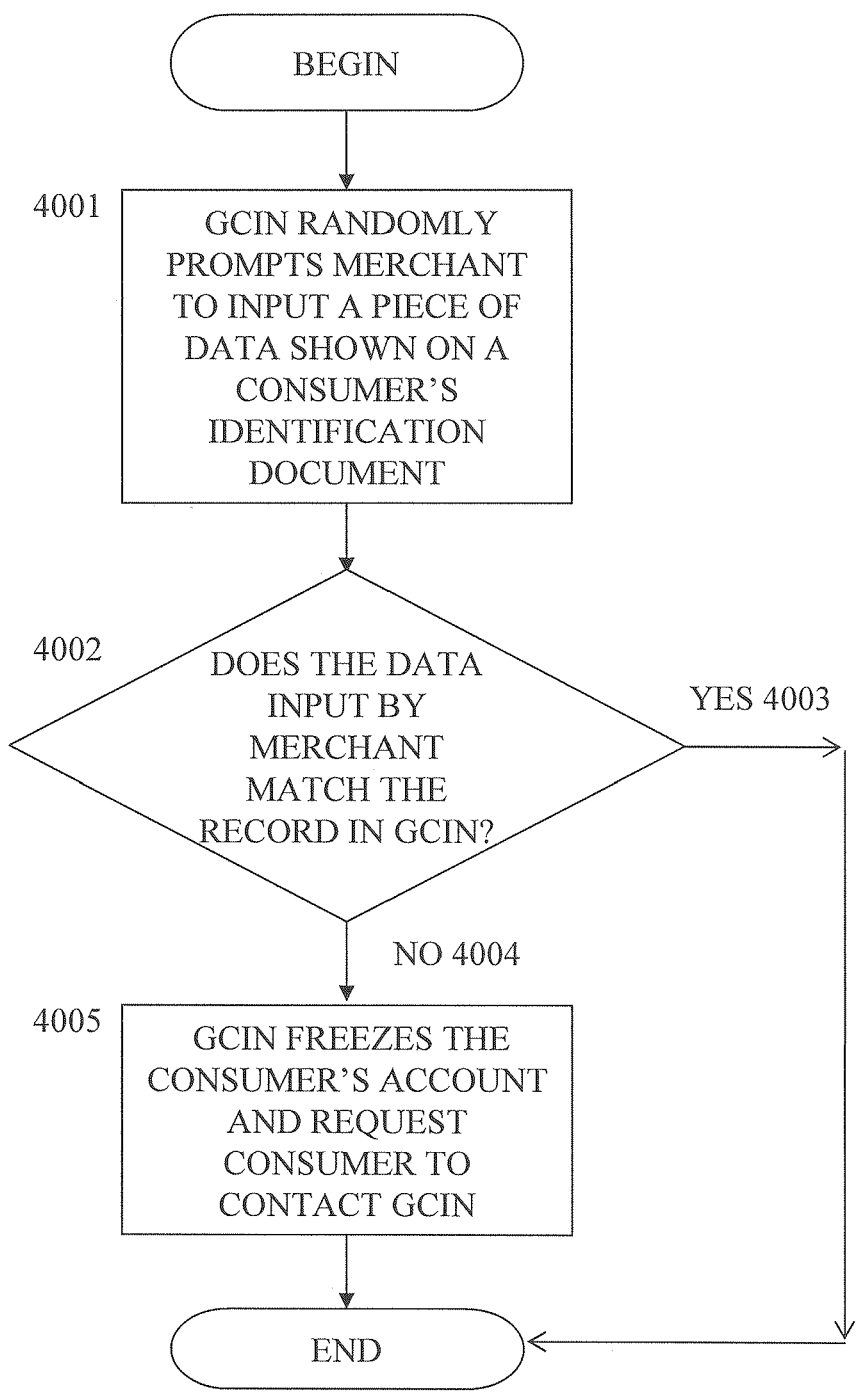
FIG. 4 is flowchart of an example process, explaining how the system shown in FIG. 1 determines whether a consumer has provided correct personal identification information to GCIN.

In one embodiment, the above process as described in the flowchart in FIG. 4 will be repeated at multiple locations at different times and different merchants are involved. If all merchants involved have entered the correct pieces of data as prompted by the GCIN computer system 500, the consumer 100 is presumed to have submitted correct personal identification information during the account opening process. As a result, the GCIN computer system 500 has successfully completed the customer identification process of the consumer 100.

The methodologies described herein may be implemented by various means depending upon the application. For example, these methodologies may be implemented in hardware, firmware, software, or any combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM, DVD, or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. The communication apparatus may not store all of the instructions and/or data on a computer readable medium.

The embodiments described in this disclosure can be assembled to form a variety of applications based on the need. Those skilled in the art and technology to which this disclosure pertains can appreciate that alterations and changes in the described structure may be practiced without meaningfully departing from the principal, spirit, and scope of this disclosure. Such alterations and changes should not be construed as deviations from the present disclosure.

What is claimed is:

1. A method for conducting identity verification, comprising:
issuing, at an account computer system, a financial instrument associated with an account for a customer without verifying identity data of the customer;
receiving, at the account computer system from a transaction computer system associated with a merchant, a request to approve a financial transaction between the merchant and the customer using the financial instrument;
determining a quantity of portions of identity data of the customer that were previously provided by the merchant;
determining, at the account computer system, a portion of the identity data to request, the portion of the identity data is a random portion of the identity data;
receiving, at the account computer system from the transaction computer system, a portion of the identity data in response to a request for the customer to provide the portion of the identity data from an identification document during the financial transaction based on the quantity being less than a pre-defined number, the portion of the identity data obtained by a device associated with the transaction computer system that extracts at least the portion of the identity data from identity data associated with an identification document of the customer, and the identity data associated with the identification document being unreadable by a human prior to extraction by the device;
updating, at the account computer system, customer data of the customer by combining the portion of the identity data received from the transaction computer system with different portions of previously received identity data;
comparing, at the account computer system, the updated customer data to unverified identity data of the customer; and
determining, at the account computer system, whether to maintain or terminate the account based on the comparison, such that the account is maintained with the customer when the-updated customer data matches the unverified identity data, and the account is terminated when the updated customer data does not match the unverified identity data.

2. The method of claim 1, further comprising opening the account without verifying the identity data with a credit reporting agency.

3. The method of claim 1, in which the different portions of previously received identity data were previously received from different merchants during transactions between the customer and the different merchants.

4. The method of claim 1, in which the identification document comprises at least one of a driver's license, passport, a government-issued identification document, an alien identification card, a student identification card, a social security card, a tax identification card, a national identification card, a voter identification card, a benefits card, an official identification document, or a combination thereof.

5. The method of claim 1, in which the identity data is associated with at least one of a name, an address, a date of birth, a personal identification number, a user ID, a password, a tax identification number, a type of identification document, an identity number of the identification document, a country, a state, a government organization issuing the identification document, a private organization issuing the identification document, an expiration date of the identification document, a phone number, a screen name, an e-mail address, a photograph, a fingerprint, an iris scan, a physical description, a biometrical information, or a combination thereof.

6. The method of claim 1, in which the portion of identity data is obtained from a device of the transaction computer system that extracts the identity data embedded in a storage unit of the identification document or extracts the identity data printed on the identification document.

7. The method of claim 1, further comprising transmitting, from the account computer system to the transaction computer system, a message approving the financial transaction when a portion of the unverified identity data matches the portion of identity data.

8. The method of claim 1, in which the account computer system comprises at least one of a personal communications device, a device interface, or a combination thereof.

9. The method of claim 1, in which the transaction computer systems comprises at least one of a personal communications device, a device interface, or a combination thereof.

10. The method of claim 1, further comprising freezing, by the account computer system, the account when the identity profile does not match the unverified identity data.

11. The method of claim 1, further comprising limiting, by the account computer system, a total transaction amount for the account until the account computer system determines that the unverified identity data matches the identity profile.

12. An apparatus for conducting identity verification at an account computer system, the apparatus comprising:
a memory; and
at least one processor coupled to the memory, the at least one processor configured:
to issue a financial instrument associated with an account for a customer without verifying identity data of the customer;
to receive, from a transaction computer system associated with a merchant, a request to approve a financial transaction between the merchant and the customer using the financial instrument;
to determine a quantity of portions of identity data of the customer that were previously provided by the merchant;
to determine a portion of the identity data to request, the portion of the identity data is a random portion of the identity data;
to receive, from the transaction computer system, a portion of the identity data in response to a request for the customer to provide the portion of the identity data from an identification document during the financial transaction based on the quantity being less than a pre-defined number, the portion of the identity data obtained by a device associated with the transaction computer system that extracts at least the portion of the identity data from identity data associated with an identification document of the customer, and the identity data associated with the identification document being unreadable by a human prior to extraction by the device;
to update customer data of the customer by combining the portion of the identity data received from the transaction computer system with different portions of previously received identity data;

to compare the updated customer data to unverified identity data of the customer; and to determine whether to maintain or terminate the account based on the comparison, such that the account is maintained with the customer when the updated customer data matches the unverified identity data, and the account is terminated when the updated customer data does not match the unverified identity data.

13. The apparatus of claim 12, in which the at least one processor is further configured to open the account without verifying the identity data with a credit reporting agency.

14. The apparatus of claim 12, in which the different portions of previously received identity data were previously received from different merchants during transactions between the customer and the different merchants.

15. The apparatus of claim 12, in which the identification document comprises at least one of a driver's license, passport, a government-issued identification document, an alien identification card, a student identification card, a social security card, a tax identification card, a national identification card, a voter identification card, a benefits card, an official identification document, or a combination thereof.

16. The apparatus of claim 12, in which the identity data is associated with at least one of a name, an address, a date of birth, a personal identification number, a user ID, a password, a tax identification number, a type of identification document, an identity number of the identification document, a country, a state, a government organization issuing the identification document, a private organization issuing the identification document, an expiration date of the identification document, a phone number, a screen name, an e-mail address, a photograph, a fingerprint, an iris scan, a physical description, a biometrical information, or a combination thereof.

17. The apparatus of claim 12, in which the portion of identity data is obtained from a device of the transaction computer system that extracts the identity data embedded in a storage unit of the identification document or extracts the identity data printed on the identification document.

18. The apparatus of claim 12, in which the at least one processor is further configured to transmit, to the transaction computer system, a message approving the financial transaction when a portion of the unverified identity data matches the portion of identity data.

* * * * *